(12) United States Patent
 Fischer (10) Patent No.: US 7,775,305 B1
(45) Date of Patent: *Aug. 17, 2010

(54) WHEELED HOPPING ROBOT

(75) Inventor: Gary J. Fischer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/513,717

(22) Filed: Aug. 31, 2006

Related U.S. Application Data (60) Provisional application No. 60/833,640, filed on Jul. 27, 2006.

(51) Int. Cl.
 *B62D 51/06* (2006.01)
(52) U.S. Cl. .................. 180/8.1; 180/8.2; 123/46 R; 123/46 SC
(58) Field of Classification Search .............. 180/8.2, 180/8.3; 123/46 R, 46 SC, 46 H
See application file for complete search history.

(56) References Cited

U.S. PATENT DOCUMENTS

| | | | | | |
|---|---|---|---|---|---|
| 3,269,478 | A | * | 8/1966 | Joslyn | 180/8.2 |
| 4,265,326 | A | * | 5/1981 | Lauber | 180/8.3 |
| 4,266,627 | A | * | 5/1981 | Lauber | 180/8.3 |
| 5,137,101 | A | * | 8/1992 | Schaeff | 180/8.1 |
| 6,079,510 | A | * | 6/2000 | Miyamoto | 180/8.3 |
| 6,161,639 | A | * | 12/2000 | Jones | 180/8.4 |
| 6,247,546 | B1 | | 6/2001 | Spletzer et al. | |
| 6,286,386 | B1 | | 9/2001 | Spletzer et al. | |
| 6,308,791 | B1 | | 10/2001 | Spletzer et al. | |
| 6,328,002 | B1 | | 12/2001 | Spletzer et al. | |
| 6,341,784 | B1 | * | 1/2002 | Carstens | 280/5.2 |
| 6,502,657 | B2 | | 1/2003 | Kerrebrock et al. | |
| 6,966,280 | B1 | * | 11/2005 | Carlson | 123/46 R |
| 7,263,955 | B1 | * | 9/2007 | Fischer | 123/46 R |
| 2004/0195021 | A1 | * | 10/2004 | Jeswine et al. | 180/164 |
| 2006/0151218 | A1 | * | 7/2006 | Goren et al. | 180/24.02 |

OTHER PUBLICATIONS

Fischer, Gary J., "Wheeled Hopping Mobility", Proceedings of SPIE—The International Society for Optical Engineering; 2005 v.5986, Conference: Unmanned/Unattended Sensors and Sensor Networks II; Sep. 26-28, 2005, Bruges, Belgium.

* cited by examiner

*Primary Examiner*—Lesley Morris
*Assistant Examiner*—Maurice Williams
(74) *Attorney, Agent, or Firm*—William R. Conley (57) ABSTRACT

The present invention provides robotic vehicles having wheeled and hopping mobilities that are capable of traversing (e.g. by hopping over) obstacles that are large in size relative to the robot and, are capable of operation in unpredictable terrain over long range. The present invention further provides combustion powered linear actuators, which can include latching mechanisms to facilitate pressurized fueling of the actuators, as can be used to provide wheeled vehicles with a hopping mobility.

44 Claims, 9 Drawing Sheets

WHEELED HOPPING ROBOT

RELATED APPLICATIONS

This application claims the benefit of U.S. Provisional Application No. 60/833,640 filed on Jul. 27, 2006, the entirety of which is herein incorporated by reference. This application is related to the concurrently filed application titled "Combustion Powered Linear Actuator".

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The present invention relates generally to the field of mobile robots. The present invention additionally relates to mobile robots having wheeled and hopping mobility. The present invention further relates to combustion powered linear actuators, as may be used in applications including robotic vehicles having hopping mobility.

BACKGROUND OF THE INVENTION

Ground traversing meso-scale robotic vehicles (e.g. robots on the order of or less than one cubic foot in volume) can be limited in the types of terrain they can negotiate. Typically, wheeled robots (e.g. robots comprising wheels or tracks for mobility) are unable to negotiate obstacles greater than one half their wheel diameter or one half their track length. The relative number and size of obstacles that must be negotiated by a robot, increases with decreasing size of the robot. The combination of increased relative obstacle size and, the inability of conventional wheeled or tracked robotic vehicles to traverse large obstacles leads directly to the need for a new and innovative vehicle to cope with these problems.

To meet these needs, robotic vehicles with wheeled mobility have been developed that include a hopping mobility. A wheeled hopping robot (e.g. a wheeled hopping vehicle or a "WHV") achieves an enhanced obstacle negotiation capability through the use of a linear actuator (e.g. a combustion driven piston) to provide hopping mobility in concert with motor driven wheeled mobility. A linear actuator attached to a robotic vehicle and in contact a surface supporting the vehicle (e.g. the ground) can provide hopping mobility to the vehicle by the rapid extension of the actuator, thereby imparting an upward and/or forward acceleration of the vehicle which can allow the vehicle to hop over large obstacles.

Embodiments of the invention include wheeled robotic vehicles having a powered linear actuator(s). Embodiments of the invention can include directional control provided through a steering system incorporated into the wheeled mobility, wherein the steering system can be used to orient the vehicle in a desired direction prior to initiating a hop. Other embodiments of the invention include self-righting wheeled robotic vehicles having a powered linear actuator(s). Still other embodiments of the invention comprise combustion powered linear actuators that are compact, while providing a long external stroke, and are capable of multiple hop operations. Further embodiments of the invention comprise combustion powered linear actuators including latching mechanisms that provide for pressurization of fuel-oxidizer charges delivered to the actuators. Still further embodiments of the invention comprise fuel metering, control and delivery systems for combustion powered linear actuators. Embodiments of the present invention include meso-scale robotic vehicles having wheeled and hopping mobilities, that can travel distances on the order of a few kilometers and, can traverse (i.e. hop over) obstacles many times the size of the vehicle.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

The following documents are herein incorporated in their entirety by reference: U.S. Pat. No. 6,247,546 "Hopping Robot", issued Jun. 19, 2001 to Spletzer et al., and, U.S. Pat. No. 6,328,002 "Misfire Tolerant Combustion-Powered Actuation", issued Dec. 11, 2001 to Spletzer et al.

Figure 1:
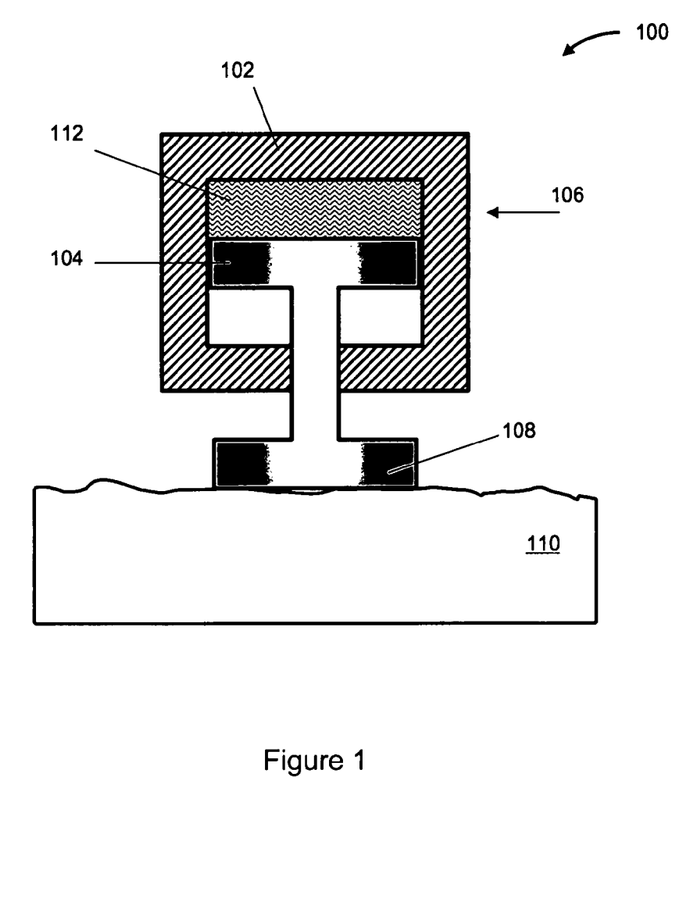
FIG. 1 is a schematic illustration of a combustion powered linear actuator.

FIG. 1 is a schematic illustration of a combustion powered linear actuator 100. Actuator 100 comprises a body 102 having a piston 104 slideably mounted within a cavity within the body 102. The cavity within the body and the piston 104 define a combustion chamber 106. A foot 108 can be attached to the piston 104 and can be configured to contact the ground 110 (i.e. a surface supporting the actuator). A combustible mixture of fuel and oxidizer 112 is introduced into the combustion chamber 106 and ignited by a mechanism such as a glow plug, heated wire, spark plug, or piezoelectric ignition. Expansion of the combusting fuel-oxidizer mixture pushes against the piston 104 rapidly driving foot 108 into the ground (i.e. extending the actuator). The reaction force to the driven piston accelerates the body 102 in an opposed direction, for example upward into the air. Delivery of fuels and oxidizers to combustion powered linear actuators is described below.

Fuels can include liquid hydrocarbons and gaseous hydrocarbons that have a critical temperature higher than the ambient temperature of the environment within which the actuator is operating. The critical temperature of a fuel is that temperature below which the fuel can exist as a liquid, and above which the fuel may only exist as a gas. This property means that the fuel can be liquefied under pressure and expanded to a gas when the pressure is reduced, which can allow for delivery of the fuel to the combustion chamber 106 without the need for a fuel pump and, can provide for delivery of a pressurized charge of fuel (and oxidizer as described below) to the combustion chamber. Some examples of fuels having critical temperatures higher than typical ambient temperatures include; propane, butane, methyl acetylene, propylene, butylene, methylacetylene-propadiene (i.e. "MAPP" gas) and combinations thereof, that typically have vapor pressures up to approximately 700 kPa (i.e. ~100 psi or ~6.9 atm) at typical ambient temperatures.

Fuels that are normally liquids at ambient temperature, for example gasoline, alcohols, diesel fuel, gasohol, white gasoline, and kerosene can be used either with a fuel pump or by providing pressurization of the fuel supply with a gas such as carbon dioxide, argon, nitrogen, neon, xenon, krypton or helium to induce fuel flow. Fuels that are normally liquids at ambient temperature can additionally require a mixing or distribution means that can include a carburetor, fuel atomizer, orifice plate, heating means, or combinations thereof to facilitate mixing of the fuel with an oxidizer prior to or upon entry into combustion the chamber 106.

Oxidizers can include air, nitrous oxide ($N_2O$), hydrogen peroxide ($H_2O_2$), nitrogen tetroxide ($N_2O_4$), oxygen ($O_2$), nitric acid ($HNO_3$) or combinations thereof for combustion with the fuel. In the case of an oxidizer having a critical temperature higher than the ambient temperature, for example nitrous oxide ($N_2O$), the vapor pressure of the oxidizer can be used to deliver the oxidizer to the combustion chamber 106 without the need for a pump. Oxidizers that are normally liquids at ambient temperatures, including $H_2O_2$, can be used and can require pressurization of the oxidizer supply in a manner as described above for delivery of liquid fuels.

Figure 2A:
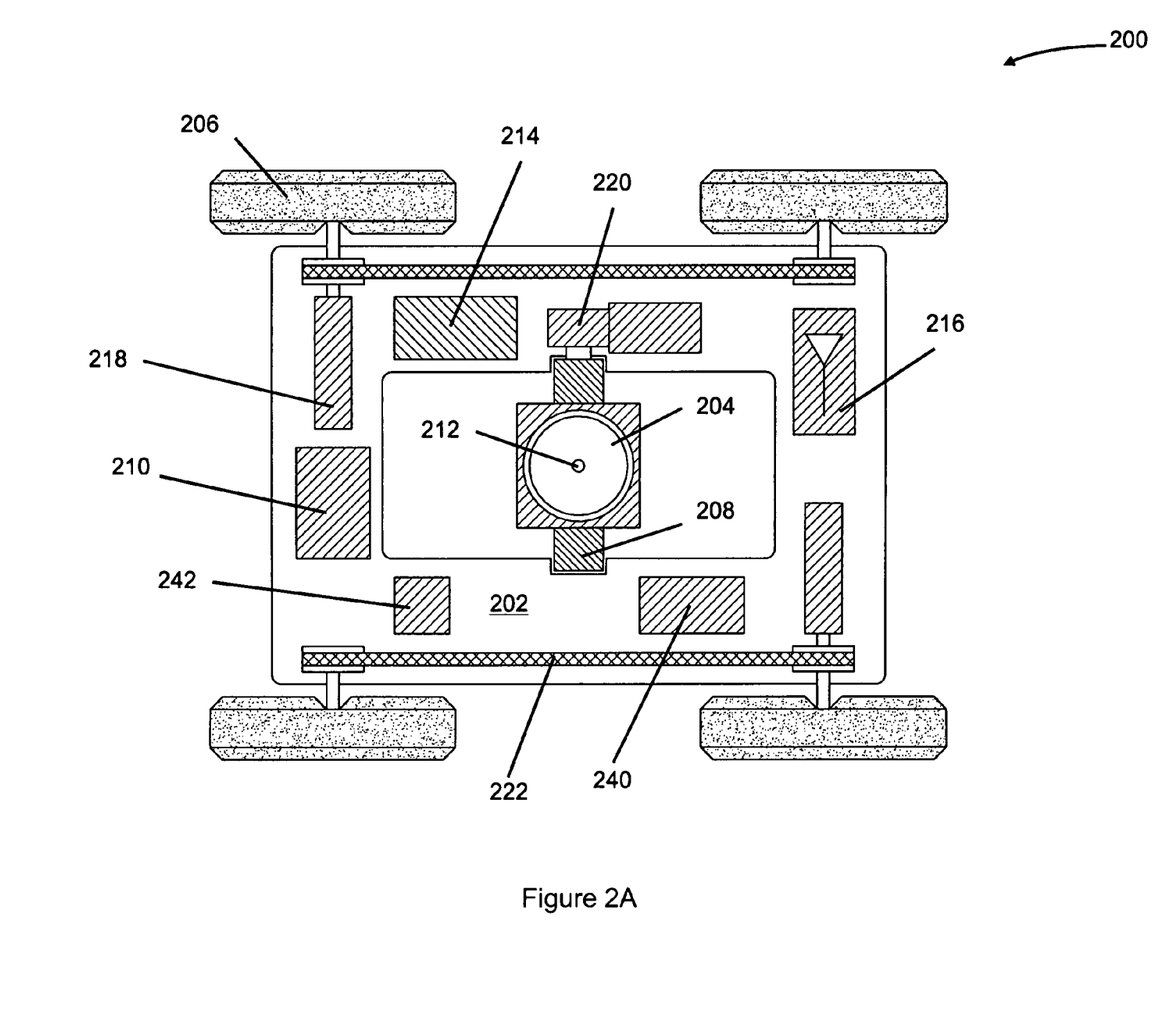
FIG. 2A is a schematic illustration of the top view of an embodiment of a wheeled hopping robot according to the present invention.

FIG. 2A is a schematic illustration of the top view of an embodiment of a wheeled hopping robot 200 according to the present invention. Wheeled hopping robot 200 comprises a frame 202 and a linear actuator 204 to provide hopping mobility and, wheels 206 coupled to one or more drive motors 218 to provide wheeled mobility. Actuator 204 can be attached to the frame 202 by a rotatable mount 208 to allow the actuator 204 to be rotated to a desired orientation with respect to the frame, for example by a servomotor 220. Actuator 204 can comprise a combustion powered linear actuator with fuel for the actuator 204 stored in a tank 210 carried by the robot 200. A fueling system 242 (described below) can be provided to deliver fuels and oxidizers to the actuator 204 which can be ignited by a glow plug 212. Control of the robot 200 and communications between the robot 200 and a control station can be accommodated by incorporating a transceiver 216 and associated servos and controls (not shown). A processor 240 (e.g. a micro-processor, a computer, a logic device and/or and application specific integrated circuit i.e. an "ASIC") can be carried by the robot 200 and can be coupled to the transceiver 216 to integrate the control and communication functions for operating the robot. Electrical power for the components comprising the robot 200 can be stored in on-board batteries 214.

Wheels 206 and drive motors 218 provide wheeled mobility to propel the robot 200 forward and backward. Control of the orientation of the robot 200 prior to a hop and steering of the robot while under wheeled power can be by accomplished by coupling the action of the wheels on either side of the vehicle to provide skid steering control. In this example a belt or chain 222 is illustrated but other electro-mechanical devices can be employed as well. Wheels 206 can comprise a compliant material, for example foam rubber or other elastic material, to absorb the shock associated with a landing after a hop. In FIG. 2A, actuator 204 is illustrated as rotated "up", i.e. in a vertical position where the "foot" of the actuator points towards the ground. Actuation of the actuator 204 causes the foot to be rapidly extended into the ground with sufficient force to cause the robot to hop or leap into the air. Rotating the actuator 204 to less than vertical also provides forward or backward acceleration to the robot allowing it to hop over obstacles too large to be negotiated by the wheels 206.

Figure 2B:
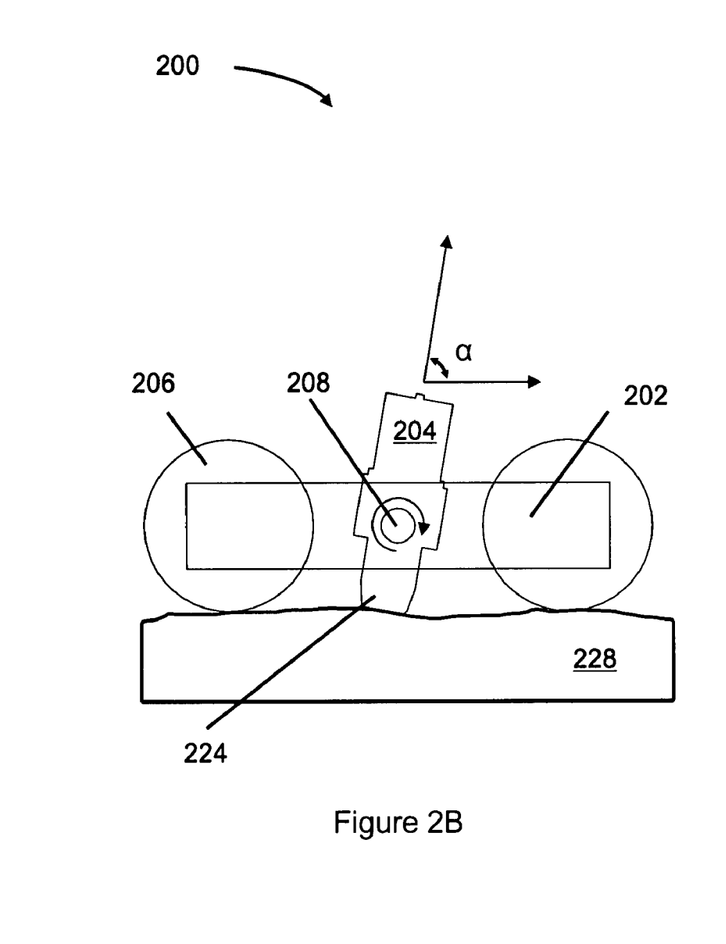
FIGS. 2B through 2D are schematic side view illustrations of the wheeled hopping robot from FIG. 2A.

FIG. 2B is a schematic side view illustration of the embodiment of a wheeled hopping robot 200, from FIG. 2A. Actuator 204 is attached to the frame 202 by a rotatable mount 208 allowing the actuator 204 to be oriented at an angle "a" with respect to the frame 202. For example an orientation angle "a" of less than ninety degrees can be used to provide forward (or backward) momentum to the vehicle during a hop. Prior to a hop, actuator 204 is rotated into a position where the foot 224 of the actuator is pointed towards the ground 228. It is not necessary for the foot 224 to actually contact the ground 228 prior to actuation of the actuator 204. However, by orienting the actuator 204 so that the foot 224 does contact the ground 228 prior to actuation, a greater percentage of the energy generated by the combustion of the fuel-oxidizer mixture will transferred into the vehicles' hop, and less energy will be expended as shock waves generated by a foot striking the ground upon actuation.

Figure 2C:
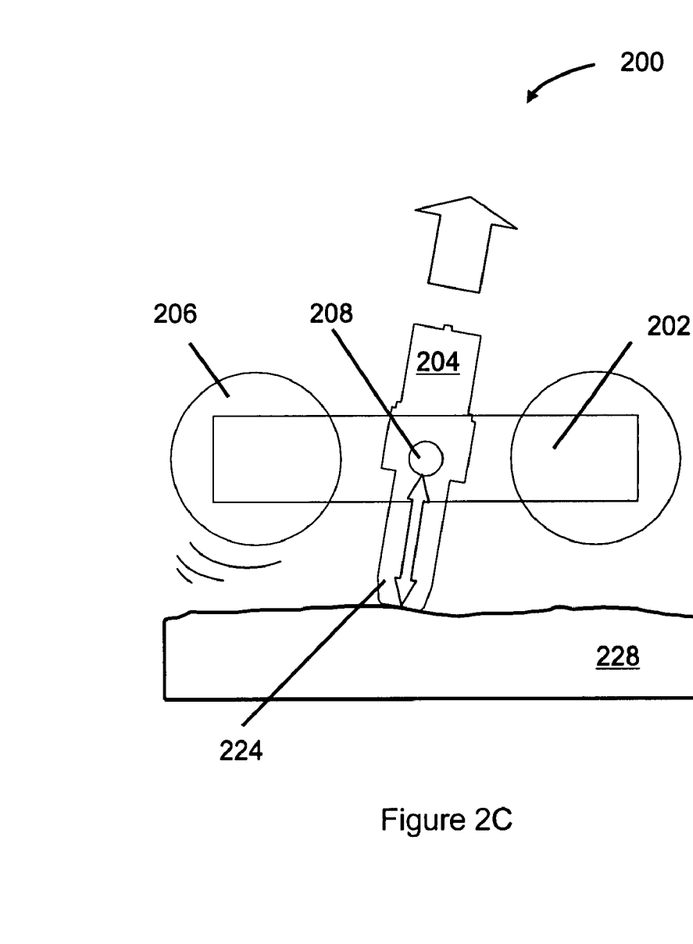

FIG. 2C is a schematic side view illustration of the wheeled hopping robot 200 from FIG. 2A, with the actuator 204 extended. FIG. 2C illustrates the effect of actuating the linear actuator 204, i.e. rapidly extending the linear actuator, which drives the foot 224 towards/into the ground, causing the robot 200 to leap or hop into the air.

Figure 2D:
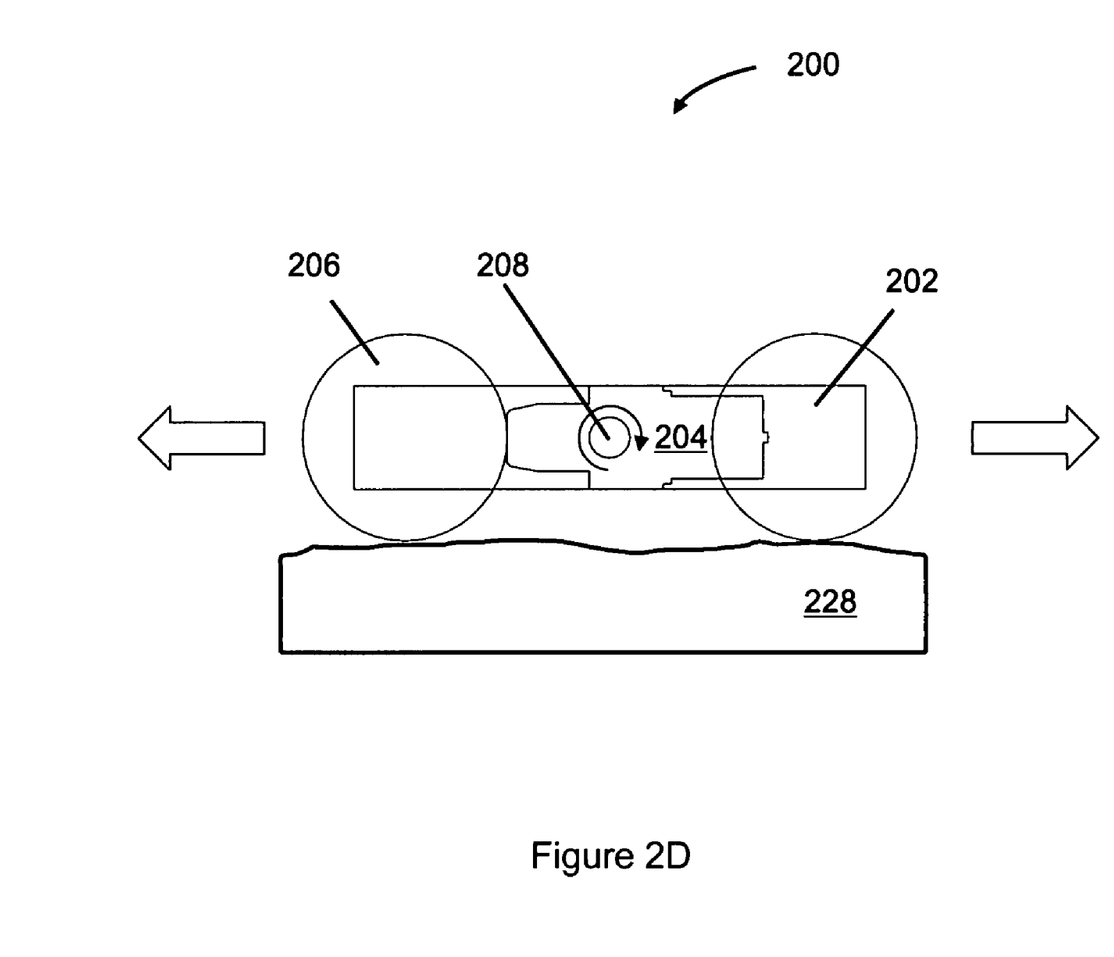

FIG. 2D is a schematic side view illustration of the wheeled hopping robot 200 from FIG. 2A. FIG. 2D illustrates that actuator 204 can be rotated into a position (i.e. a neutral position) where the actuator can be stored within the frame 202, for example, to provide additional ground clearance for the vehicle when moving under the power of the wheeled mobility. Embodiments of the robot 200 can be configured so that during a hop, e.g. while the robot is still in the air, an internal spring or restoring force mechanism within the actuator 204, returns the actuator 204 to the retracted state. A servomotor (such as 220 in FIG. 2A) can additionally be used to orient the actuator to the zero degree or neutral position within the frame 202 during a hop. In so doing, exposure of the actuator 204 to impact and shock upon vehicle landing can be minimized.

Actuator 204 can be rotated completely or partially around the axis of the mount 208 to provide "dual-sided" hopping mobility in the event the robot is turned over, or lands upside down. The configuration of the robot 200 (i.e. the frame, actuator and wheels) is such that the robot is self-righting, i.e. the hopping and wheeled mobilities of the robot are unaffected by which side the robot lands on. In this example the wheels 206 are of sufficient diameter (e.g. the diameter of the wheels is greater than the depth of the frame) to suspend the frame 202 above the ground regardless of which side the vehicle lands on and, the actuator 204 is rotatable to point the foot of the actuator towards the ground, independent of which side the robot 200 should land on. The wheeled hopping robot 200 is invertible, allowing it to be driven "upside down" making the mobility of the robot, wheeled and hopping, unaffected by the orientation of a landing, i.e. the robot 200 is self-righting.

Figure 2E:
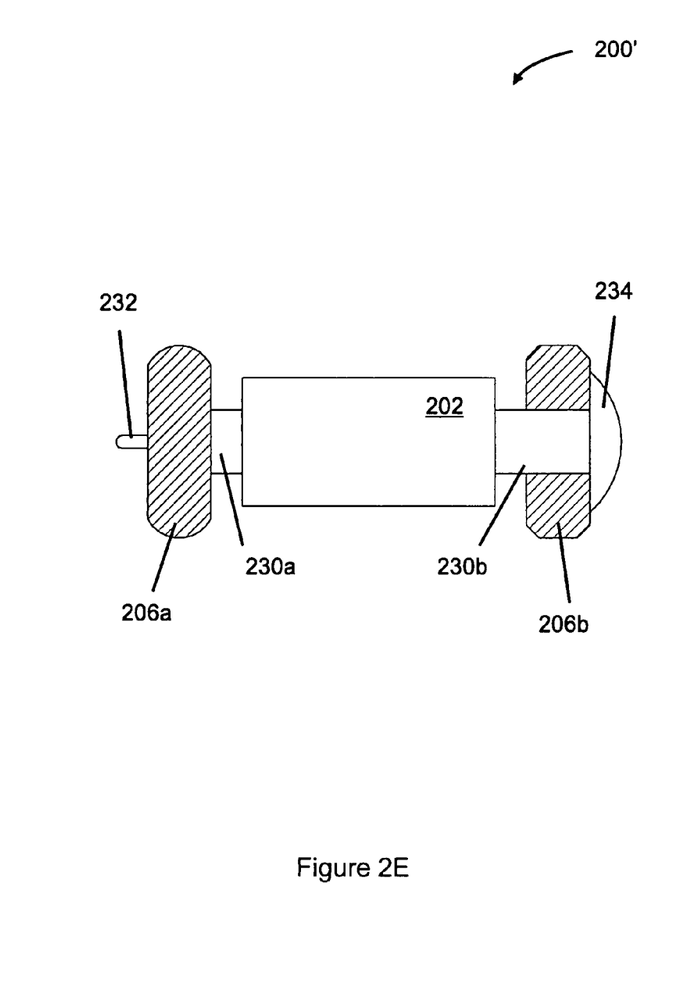
FIGS. 2E and 2F are schematic front view illustrations of embodiments of wheeled hopping robots according to the present invention.
Figure 2F:
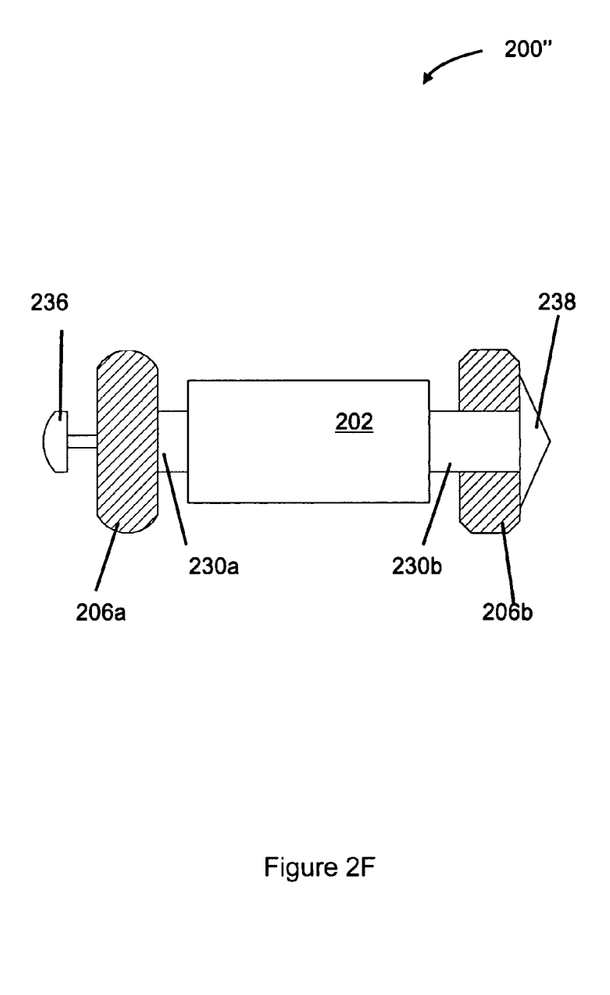

FIGS. 2E and 2F are schematic front view illustrations of embodiments of wheeled hopping robots 200' and 200" according to the present invention, and serve to illustrate additional features that can be used to facilitate the self-righting ability of wheeled hopping vehicles. The features described in the following can be used to further prevent a wheeled hopping robot from coming to rest on its side, and help enable the robot to rotate to a proper horizontal orientation. Robots 200' and 200" comprise wheels 206a and 206b mounted to frame 202 by axles 230a and 230b. Drive motors (not shown) attached to frame 202 are coupled to wheels 206a and 206b to propel the vehicles. Wheels can comprise a square or edge tapered profile as shown in wheel 206b or a rounded profile as shown for wheel 206a and can additionally comprise a tread pattern to increase traction. Several features are illustrated to facilitate a robot self-righting itself, in the unlikely event it should land directly on its side after a hop. For example, an extension 232 of an axle can include a pin or post protruding outwardly from a wheel that will prevent the robot from obtaining a stable resting position on its side. The extension 232 will serve to tilt or tip the robot sufficiently to cause the robot to fall back into either a right side up or an inverted position. A rounded or shaped pad 236 can be placed at the end of an axle extension to increase the effectiveness of the self-righting feature in softer soils or uneven terrain. Likewise a rounded 234 or angular 238 sidewall extension can be formed in a wheel itself or attached to a wheel (e.g. as a hubcap) to provide an unstable orientation of the robot should it land directly on its side, thus providing an impetus for the robot to tip back over into either a right side up or an inverted position. In some embodiments of the invention a wheel, 206b for example, can comprise an elastic material attached to an axle, 230b for example, that also comprises an elastic material. For example a foam rubber wheel may be attached to an axle comprising an elastic material (e.g. a rubber covering over a metal axle). In so doing, the shock absorption capability of the wheel/axle combination can be tuned as appropriate for a given application. Examples of wheels and elastic materials having a shock absorbing characteristic include solid (e.g. including foamed materials) hollow or pneumatic wheels comprising foam rubber and/or elastic materials such as, silicone-rubber, latex, neoprene, polyurethane and Buna-n compositions.

Referring again to FIG. 2A, actuator 204 could alternatively comprise a linear actuator powered by magnetic, electric, mechanical springs, and hydraulic mechanisms as well. In some applications of the invention, it can be desirable to mount one or more actuators 204 to the frame 202 either by rotatable or non-rotatable mounts. In the exemplary embodiment, a robotic vehicle 200 having four wheels is shown, but any number of wheels (or tracks) one or greater can be employed. For example, a triangular frame with one wheel could be used in applications where appropriate, and can easily be configured to be self-righting. An embodiment of a robotic vehicle having electric drive motors 218 is illustrated, but other drive mechanisms to power wheels or tracks can be used as well, for example, a small internal combustion engine can be appropriate. Additionally, steering of the robot could be accomplished by turning one or more wheels relative to the frame, for example by a steering linkage, as well as the skid steering approach described above.

Figure 3A:
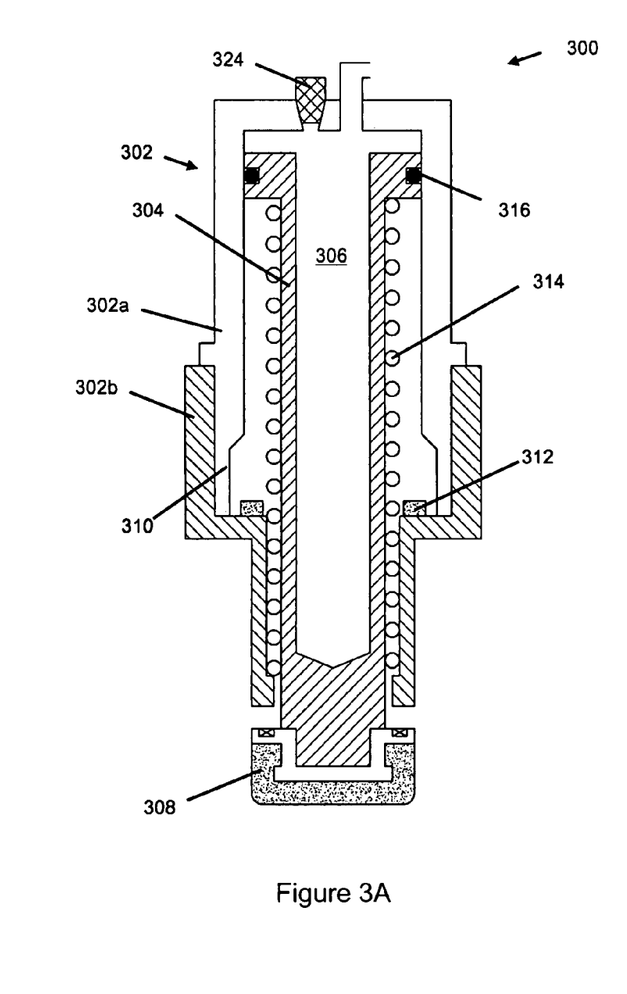
FIG. 3A is a schematic cross-sectional illustration of an embodiment of a combustion powered linear actuator according to the present invention.
Figure 3B:
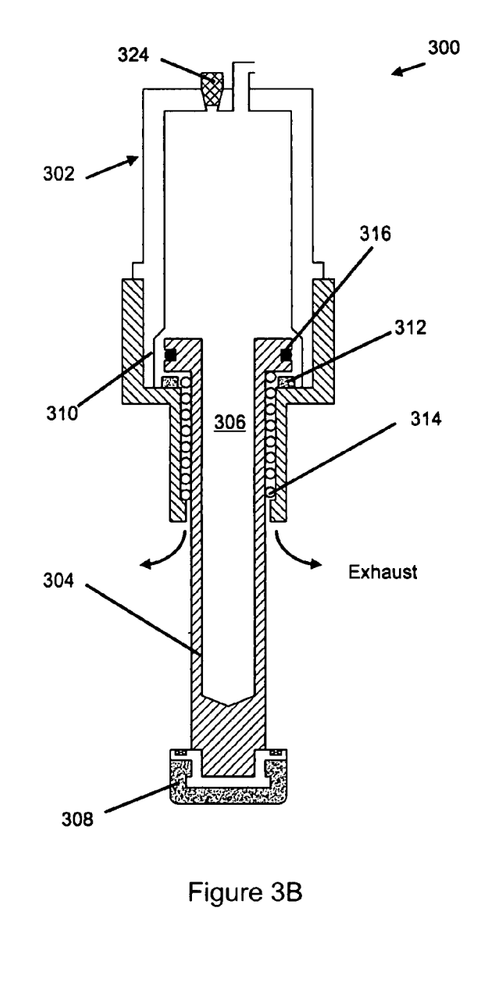
FIG. 3B is a schematic cross-sectional illustration of the combustion powered linear actuator from FIG. 3A, with the actuator extended.

FIGS. 3A and 3B are schematic illustrations of an embodiment of a combustion powered linear actuator 300, according to the present invention. FIG. 3A shows the actuator 300 in a retracted state (i.e. albeit extended slightly to facilitate illustration) with the piston 304 near to its retracted position and, FIG. 3B shows the actuator in an extended state, with the piston near to its extended position. The combustion powered actuator comprises several design developments that enable it to function as a propulsion system in hopping robotic vehicles. For meso-scale wheeled hopping robots, it can be desired that the actuator be compact in diameter as well as overall length while providing sufficient external stroke to push through softer top layers of ground such as grass thatch or loose sand. Pushing through the softer layers of ground to a more densely compacted underlying soil allows for a wheeled hopping robot to propel itself a reasonable distance, even in soft soil conditions.

The use of cylinder and piston arrangements and the ignition of fuel-oxidizer mixtures present significant challenges not found, for example, in an internal combustion engine. Throughout this description, comparisons and contrasts with internal combustion engines are used to explain the characteristics of combustion powered linear actuators according to the present invention.

Challenges in producing a combustion powered hopping vehicle include those in the related areas of cold start capability, misfire tolerance and atmospheric pressure carburetion. In embodiments of robotic vehicles that operate semi-autonomously, it can be desired to have the ability to begin hopping without external intervention beyond a trigger signal (i.e. a control signal). This is termed cold start capability. For internal combustion engines a starting system consisting of a starter motor and battery usually provides this function. During short intervals where power is not required, the internal combustion engine idles. That is, it runs at low speed consuming less fuel and doing no useful work. In the case of a combustion powered linear actuator, the very nature of the design means that there is no state comparable to the idling of an internal combustion engine, so to a large extent every hop (i.e. actuation) is a cold start. In applications where it is desired to have a hopping robot with extended range and, as batteries have a relatively low energy density, the use of significant electrical energy to provide the cold start capability is not acceptable.

Closely related to cold start is misfire tolerance. A misfire is the condition where the fuel mixture fails to ignite when the ignition system fires. After a misfire, the combustion chamber can be purged to remove the "misfired" fuel-oxidizer mixture and then replenished with a fresh charge. If an internal combustion engine misfires, the engine simply coasts through the misfire and onto the next power stroke. Since the actuator within a hopping robot does not have the stored kinetic energy of continuously moving mechanical parts, a misfire is tolerated by using other forms of energy.

Another challenge is atmospheric pressure carburetion. Carburetion consists of combining fuel and air (i.e. oxidizer) into the combustion chamber. Introducing fuel into the chamber is relatively straightforward since fuel volume is small compared to the combustion chamber volume and the fuel system can easily be pressurized. Introducing air into the combustion chamber is another matter. Four-stroke cycle internal combustion engines draw air into the cylinder by means of the vacuum generated during the intake stroke. Two-stroke cycle engines work similarly by drawing air into the crankcase under vacuum and then discharging it to the cylinder under pressure. Open flame devices such as propane torches and pressure lanterns use an accelerated fuel stream to produce a Bernoulli effect to entrain the required air. Since the hopping robot is normally in a cold start mode and must be able to hop after extended dormant periods, maintaining the combustion chamber under vacuum between hops is not feasible. The use of an entrainment system also does not apply here because the fuel-air mixture must be introduced into a closed combustion volume. In embodiments of wheeled hopping robots, an onboard oxidizer (e.g. nitrous oxide) can be used to enhance performance and significantly reduce some of the challenges discussed above. The problem of atmospheric carburetion is relaxed because air need not be drawn into the system. Rather, oxidizer under pressure (as can be fuel) is injected into the combustion chamber. Similarly, misfire tolerance is much easier to achieve since the injection of oxidizer and/or fuel-oxidizer mixtures can be used to purge the combustion volume.

Referring again to FIGS. 3A and 3B, actuator 300 includes a combustion chamber 306 that comprises a volume within the piston 304. Coupled to the piston 304 is a foot 308 for contacting the ground. Combustible fuel-oxidizer mixtures are fed into the combustion chamber 306 and ignited, for example by a glow plug 324 or similar mechanism. The rapid expansion of the fuel-oxidizer mixture drives the piston 304 downward in the illustration, to an extended state of the actuator as shown in FIG. 3B. By locating the combustion chamber 306 within the piston 304 a greater volume is available for introduction of fuel-oxidizer mixtures as opposed to a cylinder head space as found on most internal combustion engines. This geometry also increases the overall total stroke available for the piston 304, i.e. increases the extendable length of the actuator 300. An o-ring seal 316 or similar sealing means can be used to seal the piston 304 to the body 302. Body 302 can comprise one or more pieces, i.e. 302a and 302b in the illustration. Exhausting the combusted gases can be accomplished by the use of a tapered flare 310 in the body 302 located near the end of the stroke of the piston 304. As the piston 304 is extended, seal 316 moves past the taper 310 allowing for the expanding combustion gases to vent out the bottom of the body 302 into the atmosphere. The venting of the exhaust gases happens towards the end of the piston's stroke after most of the useful work has been extracted from the piston 304 contacting the ground. Flanges provided on the piston 304 and the body 302 can be used to prevent the piston 304 from traveling entirely out of the assembly. A rubber gasket 312 can be located between the flanges to cushion impacts thus minimizing shock. A restoring mechanism (i.e. a return energy source), such as a return spring 314 is located between the piston 304 and the body 302 to return the piston 304 to its original state (i.e. retracting the actuator 300) after a combustion stroke.

Pre-combustion compression or pressurization of a fuel-oxidizer mixture in a combustion chamber produces energies many times greater at ignition than combusting a fuel-oxidizer mixture at atmospheric pressure. For example, the compression stroke as used in a conventional internal combustion engine is not available to combustion powered linear actuators. Fuels and oxidizers having critical temperatures greater than ambient can be stored onboard a robotic vehicle, for example as the liquid forms of methylacetylene-propadiene and nitrous oxide, at pressures of approximately 100 psi and approximately 700 psi respectively. By regulating the pressure and order of the introduction of the gaseous forms of the fuel and oxidizer into the combustion chamber a pressurized pre-combustion mixture may be obtained, without a compression stroke.

A piston latch has been developed to allow for the fueling of the combustion chamber to pressures above atmospheric pressure. The latch provides positive locking of the piston within the actuator body above ambient pressure and breaks free with minimal friction at combustion pressures. The latch restrains the piston within the body of the actuator when pressurized fuel and oxidizer is introduced into the combustion chamber.

Figure 4:
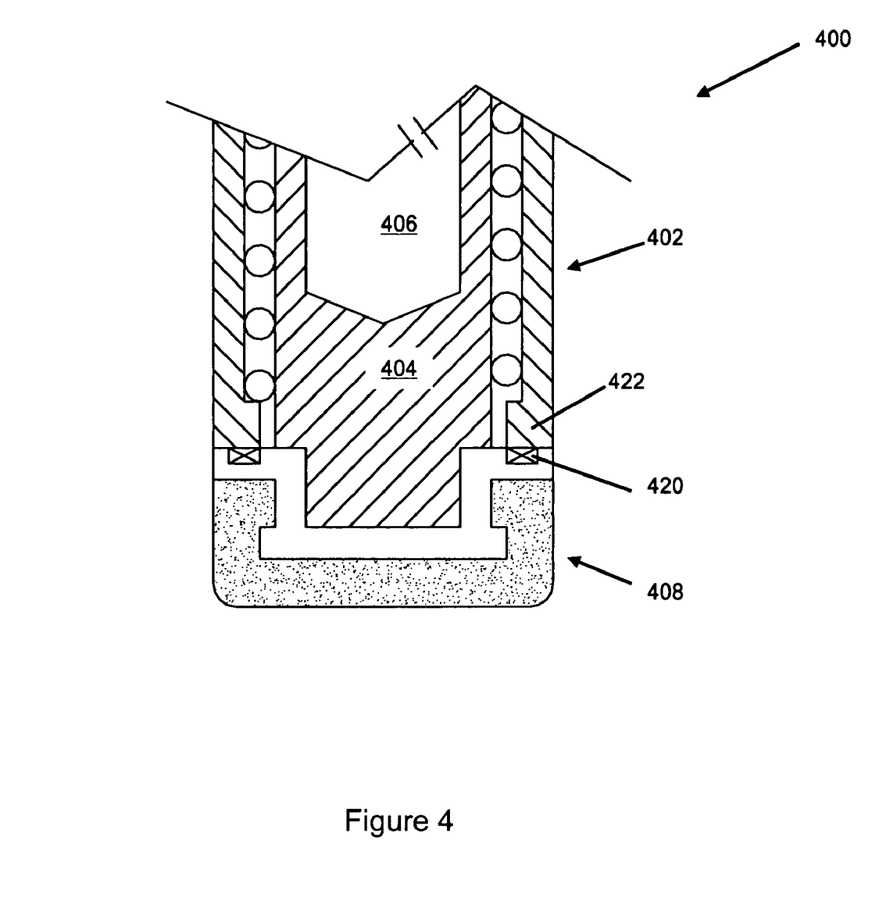
FIG. 4 is a schematic illustration of an embodiment of a piston latch according to the present invention.

FIG. 4 is a schematic illustration of an embodiment of a piston latch 400 according to the present invention. Piston 404 resides within the body 402 of a combustion powered actuator. Latch 400 comprises a magnet or a series of magnets 420 disposed within the foot 408 of piston 404. Magnets 420 couple to a ferromagnetic portion of the body 402 that can comprise a steel disc or plate 422. While fuel and oxidizer charges are introduced into the combustion chamber 406 the magnets 420 which can be placed around the periphery of the piston's foot 408, hold the piston 404 in place, i.e. prevent extension of the actuator. Upon ignition of the fuel-oxidizer mixture, the pressure within the combustion chamber increases, increasing the force exerted on the piston by the expanding combustion products. As the force on the piston increases, a force is eventually attained overcoming the force of magnetic attraction between magnets 420 and steel plate 422, the magnet/body interface breaks free allowing the piston unrestrained movement down the length of the body. A restoring mechanism, such as the spring 314 illustrated in FIGS. 3A and 3B, pushes the piston back to its original starting position after a combustion cycle. Latch 400 can comprise other releasable restraints as an application may warrant, for example, hook and loop closures, adhesive surfaces or mechanical devices as appropriate.

Figure 5:
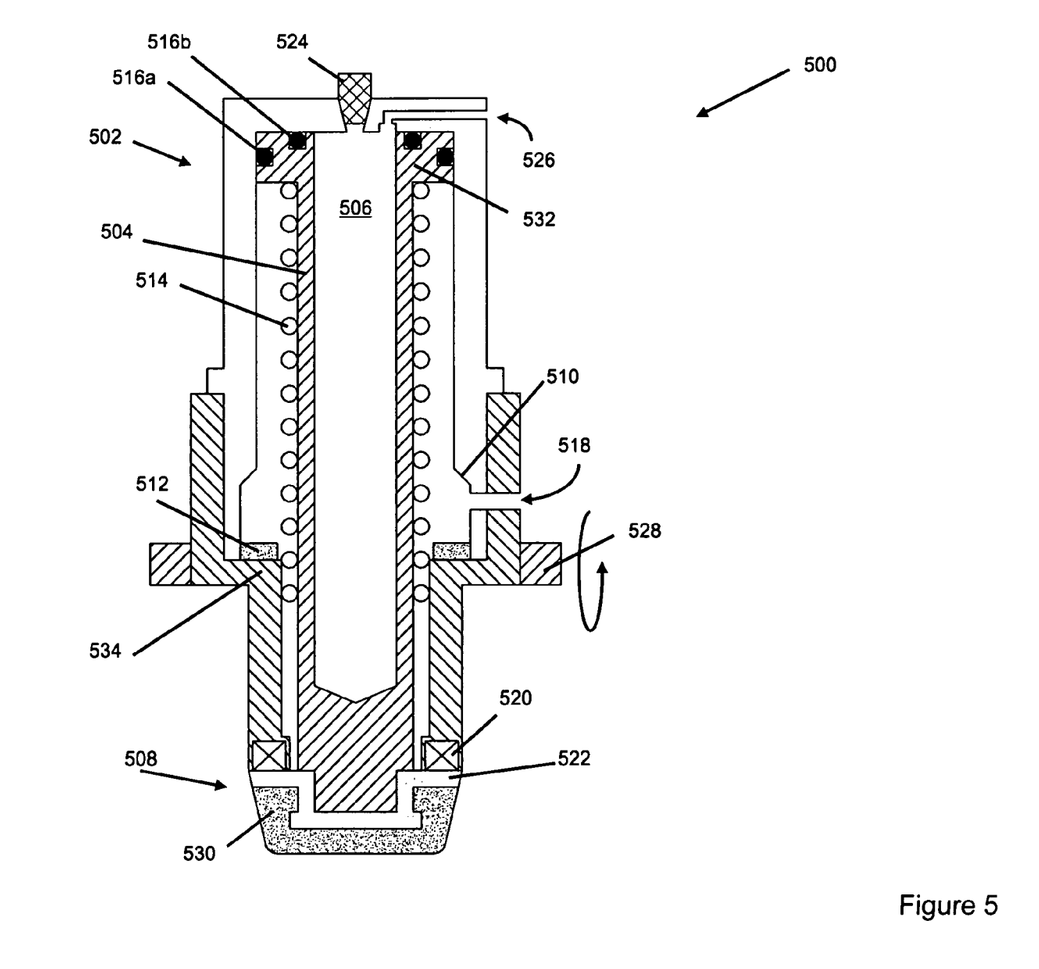
FIG. 5 is a schematic cross-sectional illustration of another embodiment of a combustion powered linear actuator according to the present invention.

FIG. 5 is a schematic illustration of another embodiment of a combustion powered linear actuator 500, according to the present invention. Actuator 500 includes a combustion chamber 506 that comprises a volume within a piston 504. Coupled to the piston 504 is a foot 508 for contacting the ground. Combustible fuel-oxidizer mixtures are fed through a port 526 into the combustion chamber 506 and can be ignited by a glow plug 524. Seals 516a and 516b, for example o-rings or u-shaped seals can be used to seal the piston 504 to the body 502. Exhausting the combusted gases can be accomplished by the use of a tapered flare 510 located in the body 502 near the end of the piston's power stroke. Additionally, an exhaust port 518 can extend through the wall of the body in the tapered section 510 to facilitate removal of combustion products from the combustion chamber 506. As the piston 504 is extended, seals 516a and 516b move past the taper 510 allowing for the expanding combustion gases to vent out the exhaust port 518 and the through the bottom of the body 502 into the atmosphere. The venting of the exhaust gases happens towards the end of the piston's stroke after most of the useful work has been extracted from the piston 504 contacting the ground. A flange 532 provided on the piston 504 and a flange 534 provided on the body 502 can be, used to restrain the piston 504 from traveling entirely out of the assembly. A rubber gasket 512 can be located between the flanges to cushion impacts thus minimizing shock due to actuation of the actuator. Restoring means, such as a return spring 514 can be located between the piston 504 and the body 502 to return the piston 504 to its original, retracted position after a combustion stroke. A rotatable mount 528 (e.g. a pivoting mount, axle or pin) can be incorporated into the body 502 to facilitate rotatable attachment of the actuator 500 to the frame of a robotic vehicle (not shown).

A piston latch comprising magnets 520 can be used to restrain the piston 504 within the body 502 of the actuator during pressurized fueling operations. In this embodiment, magnets 520 have been embedded within the lower portion of the body 502 and magnetically couple to a steel plate 522 (i.e. a ferromagnetic member) within the foot 508 to provide the restraining force. The foot 508 can comprise an overmold 530 of rubber, elastic, or other shock absorbing material, attached to the supporting plate 522. By locating seal 516b on the top surface of the flange 532 (i.e. between the top surface of the flange 532 and the end surface of the chamber within the body) the surface area of the piston 504 acted upon by a pressurized charge of fuel and oxidizer is less than if a seal 516a located on the side of flange 532 (i.e. between the side surface of the flange and the sidewall of the chamber within the body) were used alone. Locating a seal e.g. 516b on the top of flange 532 can provide for reducing the force acting against a piston latch for example, comprising magnets 520, therefore reducing the size and weight of the magnets 520 (e.g. or other latching mechanism) that may be required. Locating a seal 516a on the side of the flange 532 can result in relaxing the tolerance of the fit between the power piston 504 and body 502 which may facilitate the ease with which the power piston can extend and retract within the body.

Figure 6:
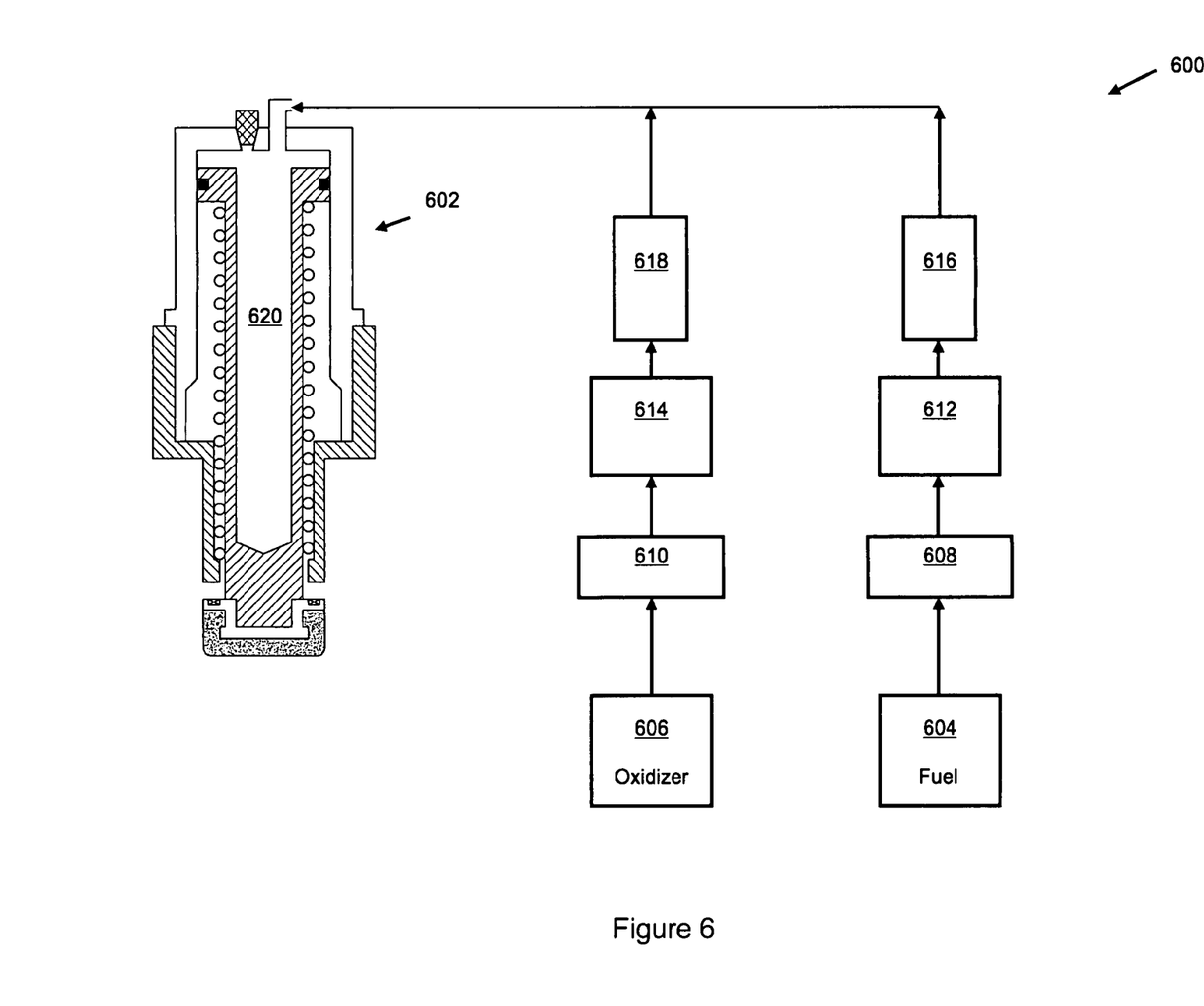
FIG. 6 is a schematic block diagram illustration of an embodiment of a fuel system according to the present invention.

FIG. 6 is a schematic illustration of an embodiment of a fueling system 600 according to the present invention. In this exemplary embodiment, the combustion chamber 620 of linear actuator 602 can be charged with mixtures of methylacetylene-propadiene (i.e. MAPP gas as fuel) and nitrous oxide (i.e. oxidizer) that are stored in self-pressurizing tanks 604 and 606 respectively.

To begin actuator fueling the MAPP gas fuel valve 612 is opened first. On some embodiments of a wheeled hopping vehicle, this can be done by a remote control signal for example, by an operator using a radio control (RC) transmitter to communicate to the robot. Opening the fuel valve 612 allows a clear path between the fuel tank 604 regulator 608 and the combustion chamber 620. The MAPP fuel regulator 608 can be set for example, to allow about 3 psi of fuel into the combustion chamber 620. The fuel valve 612 is then served to the off position. Next, the oxidizer is added to the combustion chamber 620. Once again a remote control signal from an operator turns the oxidizer valve 614 to the "on" position. The oxidizer flows through the regulator 610 which can be set for example, at about 24 psi, into the combustion chamber 620 to achieve an approximately 8:1 ratio of oxidizer to fuel. A magnetic piston latch, as described above, can be used to restrain the piston within the body of the actuator during fueling. The valve 614 is turned off, and the combustion chamber 620 is now charged with a fuel-oxidizer mixture and is ready for ignition. Check valves 618 and 616 can be provided in the system to prevent backpressure buildup that can lead to potential fuel line leaks.

From experimentation, it was determined that an approximately 8:1 ratio of nitrous oxide to MAPP gas provided acceptable performance in an embodiment of a wheeled hopping vehicle, but it was additionally found that any ratio from approximately 6:1 to approximately 10:1 yielded adequate hops. By fueling a combustion powered actuator in this manner, pre-combustion pressures up to approximately 100 psi (i.e. ~6 atm) can be obtained. The fueling operation could as well be controlled by a microprocessor that could be disposed on-board the robot. The pressure of the fuel-oxidizer mixture delivered to the combustion chamber as well as the ratio of oxidizer to fuel can be adjusted as needed for an application, for example, to adjust the height of a hop as well as to conserve fuel and/or oxidizer. In some embodiments of a fueling system, pressure transducers were used in place of the pressure regulators 608 and 610 and found to work well.

Since the oxidizer and fuel are added under pressure for each new hopping cycle, 100% flushing of the combustion chamber from the previous hop's combustion gases is unnecessary. Tests have shown virtually no difference in hop performance between flushing and not flushing the previous combustion's spent gas by-products.

Several different types of ignition systems have been used in wheeled hopping robots. The first of these was based on a high voltage spark used to ignite the fuel-oxidizer mixture. The spark ignition electronics charge a capacitor to ~300 volts. Then the capacitor is dumped into a high voltage 110:1 step up transformer to generate approximately 33,000 volts. This system worked well for igniting the fuel, but routing the high voltage signal to the spark plug can be problematic due to space constraints.

An ignition system, which uses a battery-powered glow plug and a commercially available radio controlled opto-isolated electronic switch, is used on some embodiments of wheeled hopping vehicles to combust the fuel-oxidizer mixture. After fueling, the actuator is rotated to the desired orientation. It is at this point that an RC signal is given which closes the switch, energizing the glow plug.

In one exemplary embodiment of a wheeled hopping robot according to FIG. 2A the robotic vehicle carries on-board fuel tanks, valves, pressure regulators, and a glow plug initiation system. For each hop, the fuel is metered into the combustion chamber/piston actuator. The actuator is then elevated by use of a proportional servomotor into an approximately 80 degree near vertical position with respect to the ground (this inclination provided a forward momentum for the vehicle). The foot of the piston contacts the ground in this position. The fuel is ignited. The resulting combustion drives the piston assembly into the ground and propels the robot into the air. An internal spring in the actuator returns the piston back to the starting position following the hop.

The radio controlled (RC) wheeled mobility portion of the vehicle used four wheel drive skid steering. The drive motors were modified hobbyist servomotors which move the vehicle at a rate of approximately 75 feet per minute. Medium density foam wheels were used on the robot. The wheels provided traction over a large variety of terrain as well as absorbing shocks that can be generated in vehicle landings.

A human operator can control the robot using a commercial RC transmitter. Since the proportional servomotor can rotate the propulsion actuator in either direction, the robot is invertible, allowing it to be driven upside down. The skid steering system provides directional control for each hop by simply steering the front of the vehicle towards the required direction of the hop.

The exemplary robot unit was designed to carry enough fuel to perform approximately 50 hops with a hop height of about 8 feet and a hop length of about 12 feet. An average hop was about 4 feet high by about 6 feet long. The height and number of hops is mainly determined by the size of the fuel tanks, the combustion cylinder and the pre-combustion fueling pressure among other factors including; vehicle weight, piston length, soil density, etc. Specifications for the exemplary wheeled hopping robot are given in Table 1. It should be understood that the design of a particular wheeled hopping robot can be easily adjusted to accommodate the number and height of hops, as required for a particular application, and the data presented in Table 1 should not be interpreted as limiting the invention.

TABLE 1

Specifications for an Exemplary Embodiment of a Wheeled Hopping Robot

| General: | Overall Size: 12" × 12" × 5.5" | Run Time: ~2.5 hours |
|---|---|---|
| | Weight: ~4.2 lbs | Hop Height: ~8 Feet |
| | Speed: ~75 feet per minute | Number of Hops ~50 |
| | Range: ~.9 miles | R/C Control |

TABLE 1-continued

Specifications for an Exemplary Embodiment of a Wheeled Hopping Robot

Drive Train: (4) 75 inch-ounce. Modified electric gear motors (skid steering)
System Power: Energized by (5) 1.2 v (6 v total) 1650 ma/h NiCad batteries
Hopping Actuator:
    Fuel: Methyl acetylene propadiene with nitrous oxide oxidizer
    Ignition: Opto-electron ic switch activated glow plug
    Regulated fueling up to 3.5 atmospheres
Actuator pivots 80 degrees in both directions from horizontal neutral for invertible hopping capability (upside down landings not a problem)
Chassis and Actuator Material: 6061-T6 Aluminum
Magnetic latch: Samarium-cobalt magnets.

The above described exemplary embodiments present several variants of the invention but do not limit the scope of the invention. Those skilled in the art will appreciate that the present invention can be implemented in other equivalent ways. The actual scope of the invention is intended to be defined in the following claims.

What is claimed is:

1. A robot having wheeled and hopping mobilities, the robot comprising:
a frame;
one or more wheels mounted to the frame, the one or more wheels and the frame operatively arranged to be self-righting;
means for powering the one or more wheels;
a combustion powered linear actuator attached to the frame, the combustion powered linear actuator extendable to a surface supporting the robot and, the combustion powered linear actuator operatively arranged to impart an acceleration to the robot responsive to actuation of the combustion powered linear actuator;
the combustion powered linear actuator including, a body having a first chamber therein;
    a power piston movably mounted within the first chamber, the power piston movable between a retracted position and an extended position, the power piston having a combustion chamber therein, the combustion chamber operatively arranged to combust a mixture of a fuel and an oxidizer, the combustion chamber fluidically connected to the first chamber and, the power piston having a foot operatively arranged to contact the surface;
means for providing the fuel and the oxidizer to the combustion chamber;
means for igniting the mixture of the fuel and the oxidizer within the combustion chamber;
    means for exhausting combustion products from the combustion chamber, a latch operatively connected to the body and the power piston, the latch operatively arranged to releasably restrain the power piston in the retracted position; and,
    a return energy source connected to the body and the power piston, the return energy source operatively arranged to move the power piston towards the retracted position.

2. The robot of claim 1 wherein the one or more wheels comprise a shock absorbing material.

3. The robot of claim 2 wherein the shock absorbing material comprises one or more materials selected from the group consisting of an elastic material, a rubber, a silicone-rubber, latex, neoprene, polyurethane, Buna-n rubber and a foam rubber.

4. The robot of claim 1 wherein the means for powering comprises one or more selected from the group consisting of an electric motor and an internal combustion engine.

5. The robot of claim 1 comprising a rotatable mount for attaching the linear actuator to the frame and, a servomotor connected to the rotatable mount, the servomotor operatively arranged to rotatably orient the linear actuator relative to the frame.

6. The robot of claim 5 wherein the servomotor is operatively arranged to rotatably orient the linear actuator through an angle less than or equal to approximately 360 degrees relative to the frame.

7. The robot of claim 1 wherein the one or more wheels comprise one or more tracks.

8. The robot of claim 1 comprising means for steering the robot, the means for steering operatively connected to the one or more wheels.

9. The robot of claim 1 wherein the latch comprises one or more magnets.

10. The robot of claim 9 wherein the one or more magnets comprise a portion of one or more components selected from the group consisting of the body and the foot.

11. The robot of claim 1 wherein the means for exhausting comprises a taper disposed on a wall of the first chamber, the taper operatively arranged to exhaust combustion products from the combustion chamber when the power piston is at or near the extended position.

12. The robot of claim 11 comprising a through-hole extending through the body, the through-hole disposed on the taper, the through-hole in fluid communication with the first chamber, the through-hole operatively arranged to exhaust combustion products from the combustion chamber, when the power piston is at or near the extended position.

13. The robot of claim 1 wherein the return energy source comprises a spring.

14. The robot of claim 13 wherein the spring is disposed within the first chamber.

15. The robot of claim 1 wherein the foot comprises a shock absorbing material, the shock absorbing material operatively arranged to contact the surface.

16. The robot of claim 1 wherein the power piston comprises a first flange and the body comprises a second flange, the first flange and the second flange operatively arranged to restrain the power piston within the body when the power piston is at or near the extended position.

17. The robot of claim 16 comprising one or more seals disposed between the first flange and a surface of the first chamber.

18. The robot of claim 17 comprising a shock absorbing material disposed between the first flange and the second flange.

19. The robot of claim 1 wherein the means for igniting comprises one or more components selected from the group consisting of a glow plug, a spark plug, a heated wire, and a piezoelectric ignition.

20. The robot of claim 1 wherein the latch is operatively arranged to restrain the power piston in the retracted position, the power piston restrained against a force generated by a pressure within the combustion chamber equal to or less than approximately six atmospheres.

21. The robot of claim 1 wherein the means for providing fuel and oxidizer to the combustion chamber comprises:

a fuel storage tank and an oxidizer storage tank, the fuel and the oxidizer storage tanks operatively arranged to store a pressurized fuel and a pressurized oxidizer respectively; and, a delivery system for conveying the fuel and the oxidizer from the fuel and the oxidizer storage tanks, to the combustion chamber.

22. The robot of claim 21 wherein the fuel and the oxidizer each have a critical temperature higher than a temperature of the environment within which the actuator is operated.

23. The robot of claim 22 wherein the delivery system comprises for each of the fuel and the oxidizer one or more selected from the group consisting of a pressure regulator and a pressure transducer.

24. The robot of claim 1 wherein the fuel comprises one or more fuels selected from the group consisting of propane, butane, methyl acetylene, propylene, butylene, and methylacetylene-propadiene.

25. The robot of claim 1 wherein the oxidizer comprises one or more selected from the group consisting of nitrous oxide and nitrogen tetroxide.

26. The actuator of claim 1 wherein the mixture of the fuel and the oxidizer comprises a mixture having a pressure of from approximately one atmosphere to approximately six atmospheres.

27. A robot having wheeled and hopping mobilities, the robot comprising:
   a frame;
   a plurality of wheels mounted to the frame, the plurality of wheels and the frame operatively arranged to be self-righting;
   one or more electric motors mounted to the frame, the one or more electric motors operatively arranged to power at least one of the plurality of wheels;
   an electrical storage device mounted to the frame, the electrical storage device operatively connected to the electric motors; and, a combustion powered linear actuator mounted to the frame by a rotatable mount, the actuator extendable to a surface supporting the robot and, the actuator operatively arranged to impart an acceleration to the robot responsive to actuation of the actuator, the actuator comprising:
   a body having a first chamber therein;
      a power piston movably mounted within the first chamber, the power piston movable between a retracted position and an extended position, the power piston having a combustion chamber therein, the combustion chamber operatively arranged to combust a mixture of a fuel and an oxidizer, the combustion chamber fluidically connected to the first chamber and, the power piston having a foot operatively arranged to contact the surface;
   a fuel storage tank and an oxidizer storage tank, the fuel and the oxidizer storage tanks operatively arranged to store a pressurized fuel and a pressurized oxidizer respectively;
   a delivery system for conveying the fuel and the oxidizer from the fuel and the oxidizer storage tanks, to the combustion chamber;
   a glow plug operatively arranged to ignite the mixture of the fuel and the oxidizer within the combustion chamber;
      a taper disposed on a wall of the first chamber, the taper operatively arranged to exhaust combustion products from the combustion chamber when the power piston is at or near the extended position;
   a latch operatively connected to the body and the power piston, the latch operatively arranged to releasably restrain the power piston in the retracted position, the latch comprising one or more magnets disposed in the body, the one or more magnets operatively arranged to magnetically couple to a member within the foot when the power piston is at or near the retracted position; and,
   a spring connected to the body and the power piston, the spring disposed within the first chamber, the spring operatively arranged to move the power piston towards the retracted position.

28. The robot of claim 27 wherein the plurality of wheels comprise a plurality of wheels mounted on a first side and a plurality of wheels mounted on an opposed side of the frame, the plurality of wheels mounted on the first side being operatively coupled and the plurality of wheels mounted on the opposed side being operatively coupled, thereby providing skid steering of the robot.

29. The robot of claim 27 wherein the plurality of wheels comprises a shock absorbing material.

30. The robot of claim 29 wherein the shock absorbing material comprises one or more materials selected from the group consisting of an elastic material, a rubber, a silicone-rubber, latex, neoprene, polyurethane, Buna-n rubber and a foam rubber.

31. The robot of claim 29 comprising a servomotor connected to the rotatable mount and the frame, the servomotor operatively arranged to rotatably orient the actuator relative to the frame.

32. The robot of claim 27 comprising a transceiver mounted on the frame, the transceiver operatively arranged to provide communication with the robot, to a remote user.

33. The robot of claim 32 comprising a processor, the processor operatively connected with the transceiver, the processor operatively arranged to control the operation of the robot.

34. The robot of claim 27 wherein the actuator comprises a throughhole extending through the body, the through-hole disposed on the taper, the through hole in fluid communication with the first chamber, the through hole operatively arranged to exhaust combustion products from the combustion chamber, when the power piston is at or near the extended position.

35. The robot of claim 27 wherein the foot comprises a shock absorbing material, the shock absorbing material operatively arranged to contact the surface.

36. The robot of claim 27 wherein the power piston comprises a first flange and, the body comprises a second flange, the first flange and the second flange operatively arranged to restrain the power piston within the body when the power piston is at or near the extended position.

37. The robot of claim 36 wherein:
   the first flange comprises a top surface and a side surface;
   the first chamber comprises an end surface and a sidewall; and, a first is seal disposed between the top surface and the end surface, the first seal operatively arranged to contact the top surface and the end surface when the power piston is at the retracted position.

38. The robot of claim 37 comprising a second seal, the second seal disposed between the side surface and the sidewall.

39. The robot of claim 36 comprising a shock absorbing material disposed between the first flange and the second flange.

40. The robot of claim 27 wherein the fuel comprises one or more fuels selected from the group consisting of propane, butane, methyl acetylene, propylene, butylene, and methylacetylene-propadiene.

41. The robot of claim 27 wherein the oxidizer comprises one or more oxidizers selected from the group consisting of nitrous oxide and nitrogen tetroxide.

42. The robot of claim 27 wherein the delivery system comprises for each of the fuel and the oxidizer, one or more components selected from the group consisting of a pressure regulator and a pressure transducer.

43. The robot of claim 27 wherein the mixture of fuel and oxidizer comprises a mixture having a pressure from approximately one atmosphere to approximately six atmospheres.

44. The robot of claim 27 wherein the plurality of wheels comprises one or more self righting elements selected from the group consisting of an axle extension, a pad attached to an axle extension and a sidewall extension disposed on a wheel.

* * * * *